W. N. MEARS.
ROTARY POWER TRANSFORMER.
APPLICATION FILED MAR. 19, 1909.

1,192,665.

Patented July 25, 1916.
8 SHEETS—SHEET 1.

Witnesses:
Harry C. Luce.
Edwin P. Luer

Inventor:
William Nichols Mears,
by Emery and Booth
Attys.

W. N. MEARS.
ROTARY POWER TRANSFORMER.
APPLICATION FILED MAR. 19, 1909.

1,192,665.

Patented July 25, 1916.
8 SHEETS—SHEET 3.

Witnesses:
Harry O. Luce
Edwin P. Luce

Inventor:
William Nichols Mears:
by Emery and Booth
Att'ys.

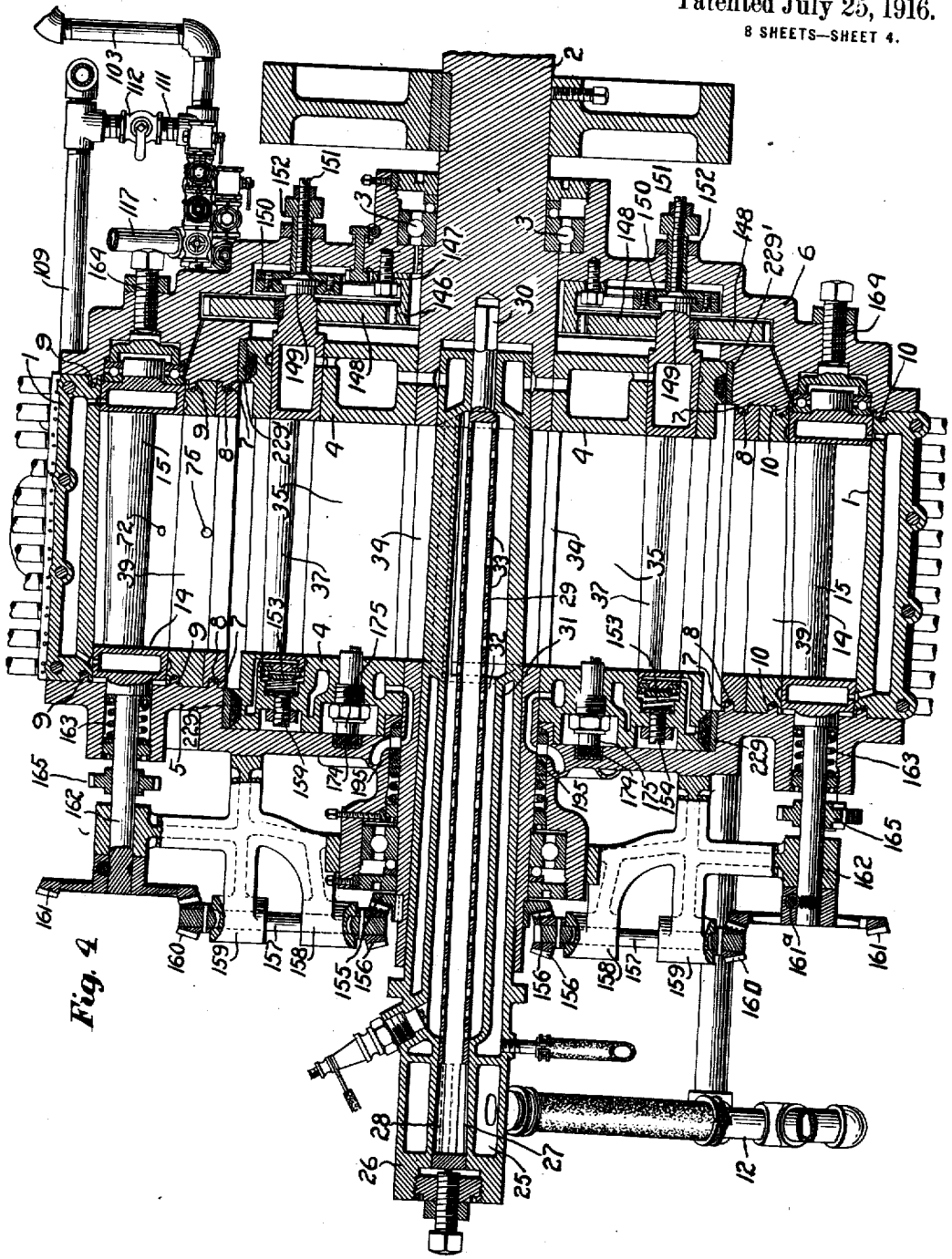

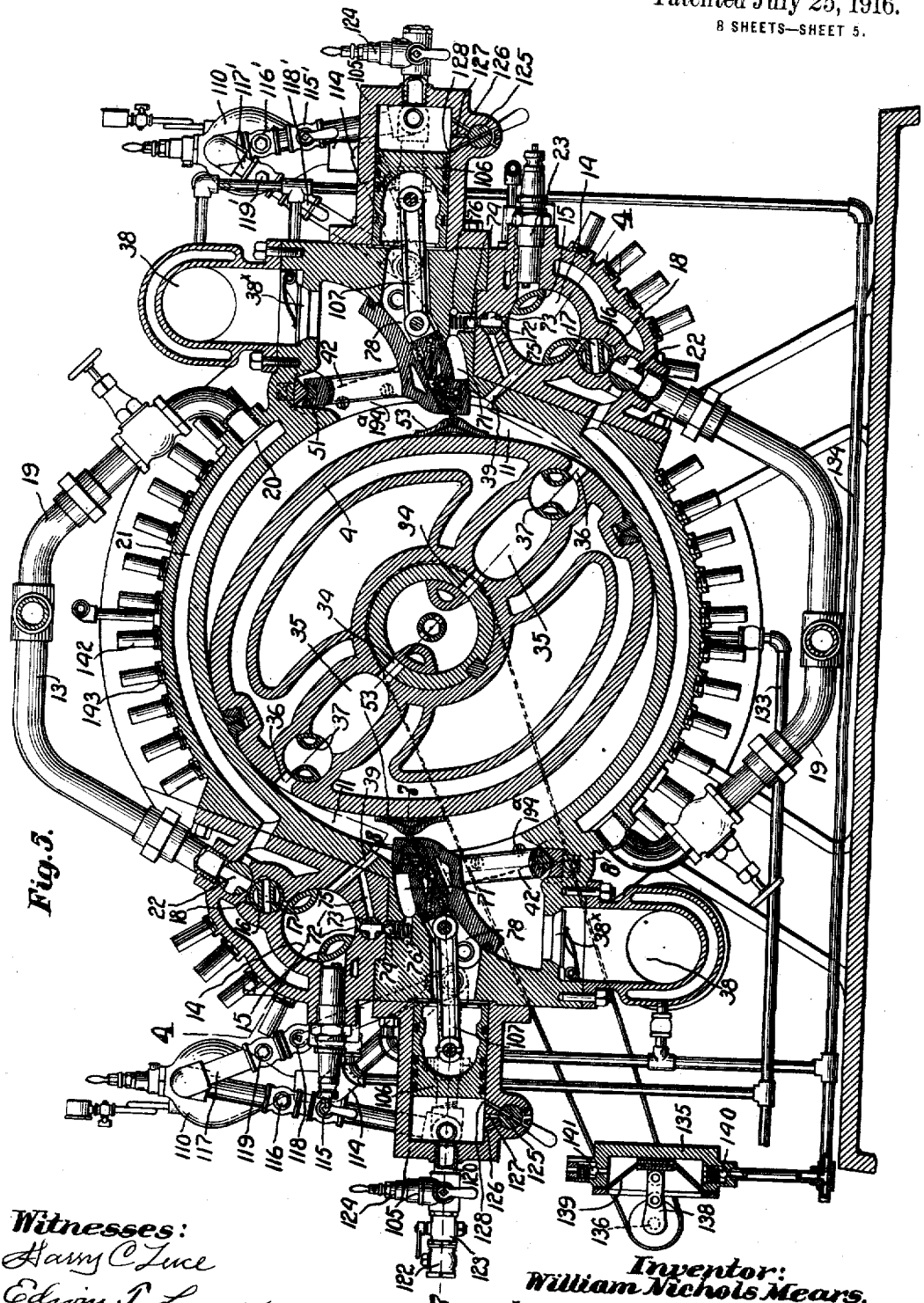

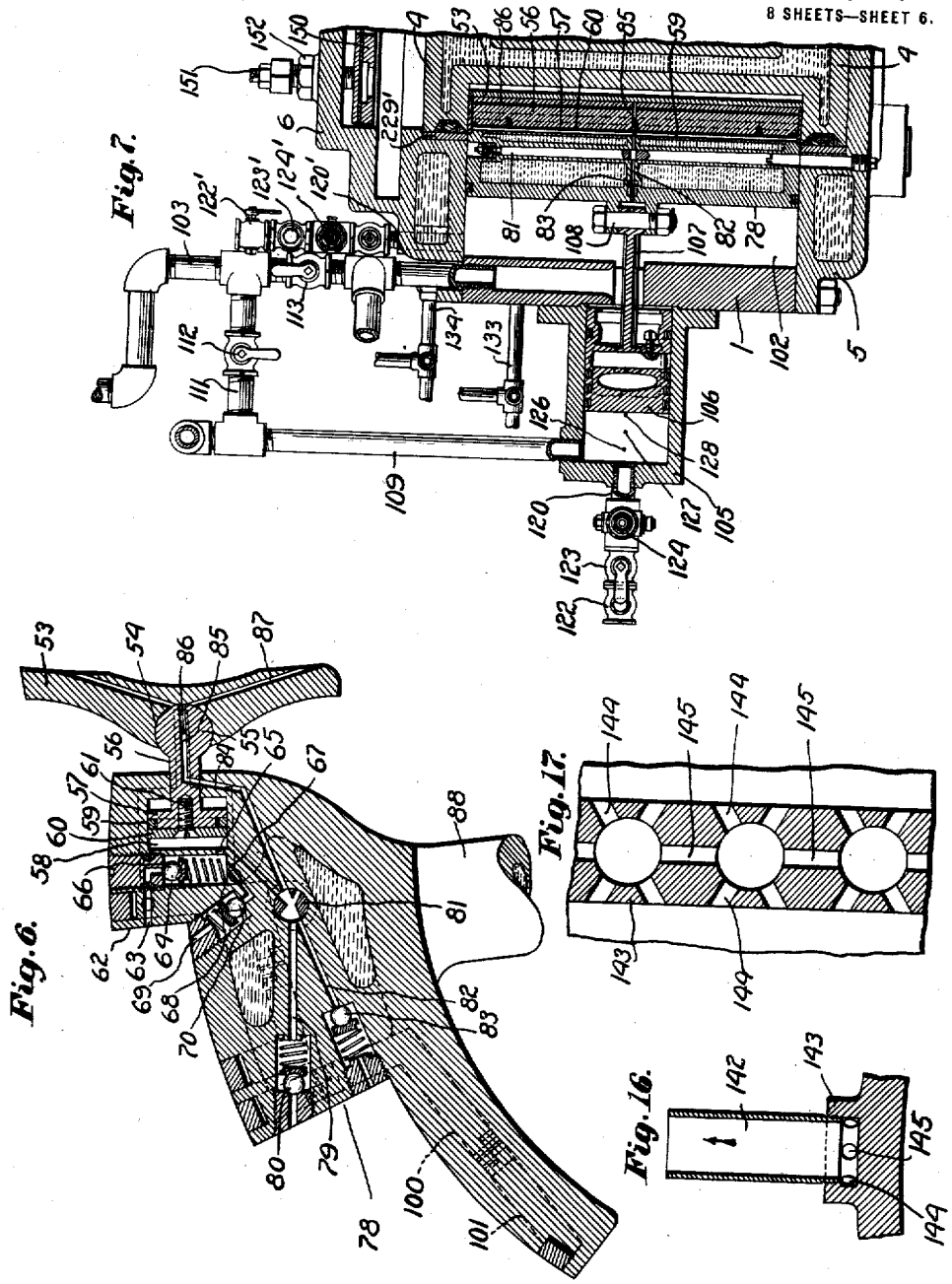

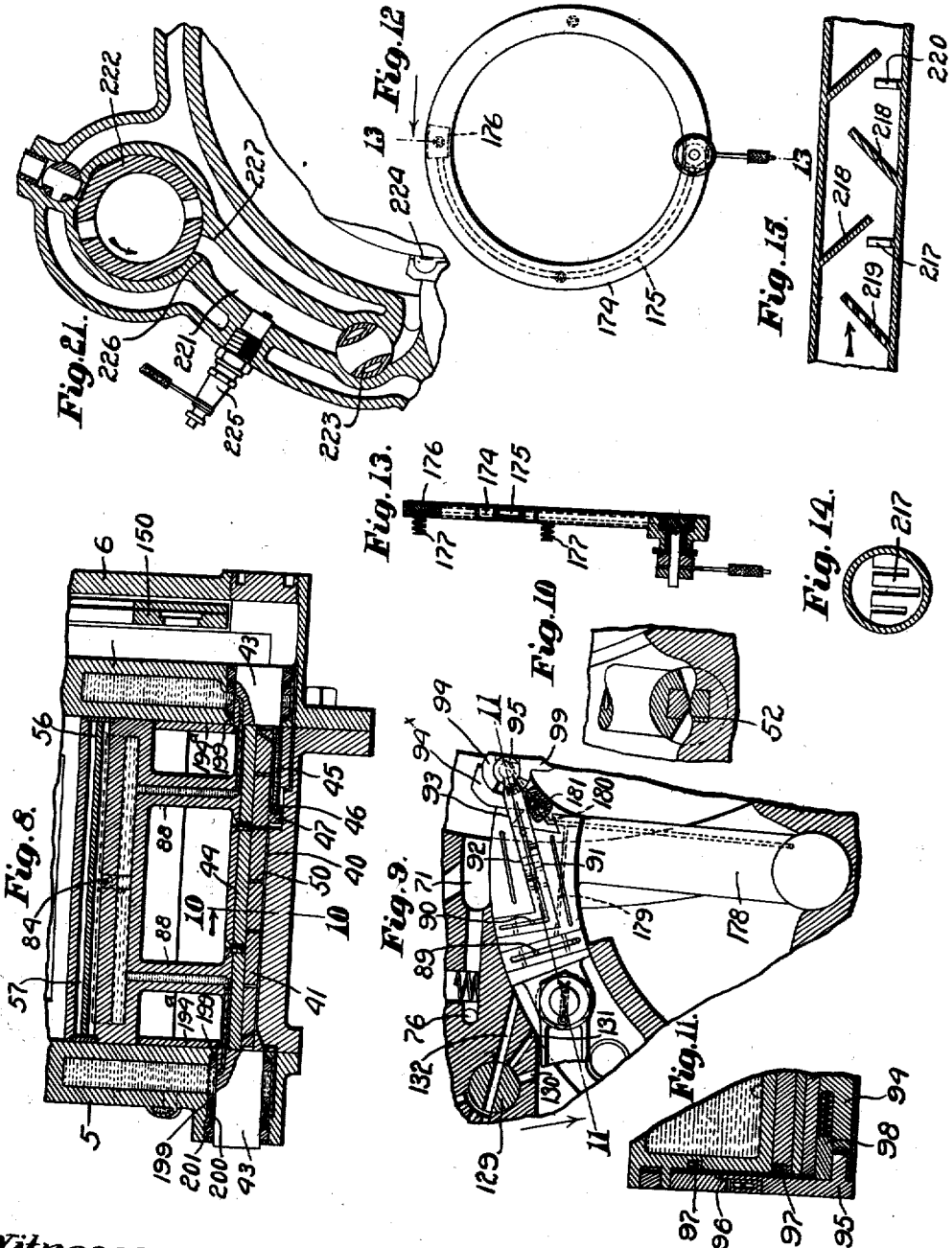

W. N. MEARS.
ROTARY POWER TRANSFORMER.
APPLICATION FILED MAR. 19, 1909.
1,192,665.
Patented July 25, 1916.
8 SHEETS—SHEET 8.
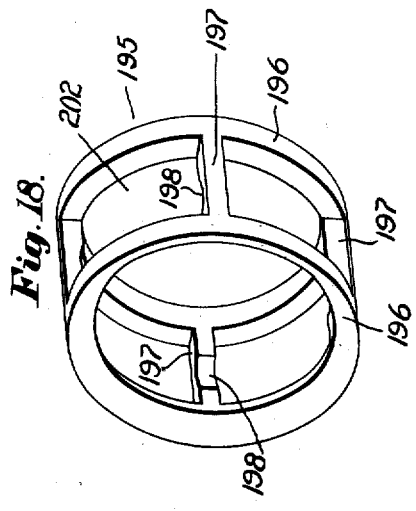
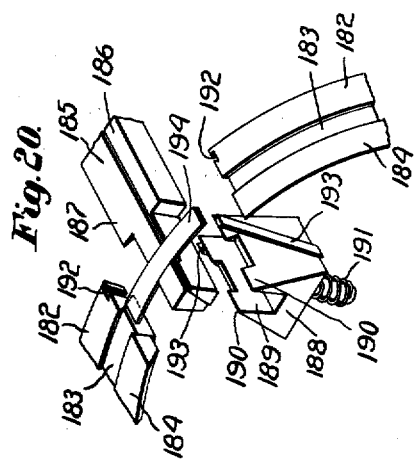
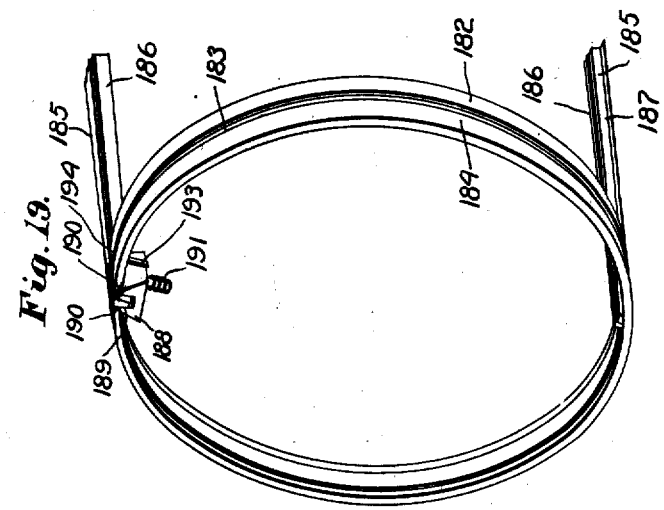
Witnesses:
Harry O. Luce
Edwin T. Luce
Inventor:
William Nichols Mears,
by Emery and Booth
Att'ys.

UNITED STATES PATENT OFFICE.

WILLIAM NICHOLS MEARS, OF BROOKLINE, MASSACHUSETTS, ASSIGNOR TO AMERICAN ROTARY MOTOR COMPANY, OF BOSTON, MASSACHUSETTS, A CORPORATION OF MAINE.

ROTARY POWER-TRANSFORMER.

1,192,665.  Specification of Letters Patent.  Patented July 25, 1916.

Application filed March 19, 1909. Serial No. 484,485.

*To all whom it may concern:*

Be it known that I, WILLIAM NICHOLS MEARS, a citizen of the United States, residing at Brookline, in the county of Norfolk and State of Massachusetts, have invented an Improvement in Rotary Power-Transformers, of which the following description, in connection with the accompanying drawings, is a specification, like letters on the drawings representing like parts.

This invention relates to rotary compressors, pumps and engines, the latter being preferably of the internal combustion type, and wherein I may employ a suitable agent or agents. If a non-explosive agent or agents be employed, I may utilize steam, air or other fluid under pressure, and if an explosive mixture or mixtures be employed I may utilize any suitable agents, as, for example, an explosive mixture of air and alcohol or air and gasolene, or air and kerosene or gas, or in fact any suitable hydrocarbon or other agent which, when mixed with air or other suitable fluid, produces an explosive mixture. If desired, any suitable gas or other substance, whether fluid or non-fluid, may be employed which when ignited produces an explosion that may be utilized in the production of rotary motion, or a continuously burning gas or fluid may be employed to be used alone or to be mixed with other agents of any suitable nature. I also contemplate the utilization of a plurality of explosive mixtures or substances, it being apparent, however, that if a plurality of explosive substances or mixtures be employed I may utilize an explosive agent. In the practice of my invention the explosive substances, when of a liquid nature, are preferably supplied under pressure.

In order that the principles of the invention may be clearly understood, I have disclosed a single embodiment thereof in the accompanying drawings, wherein—

Figure 1:
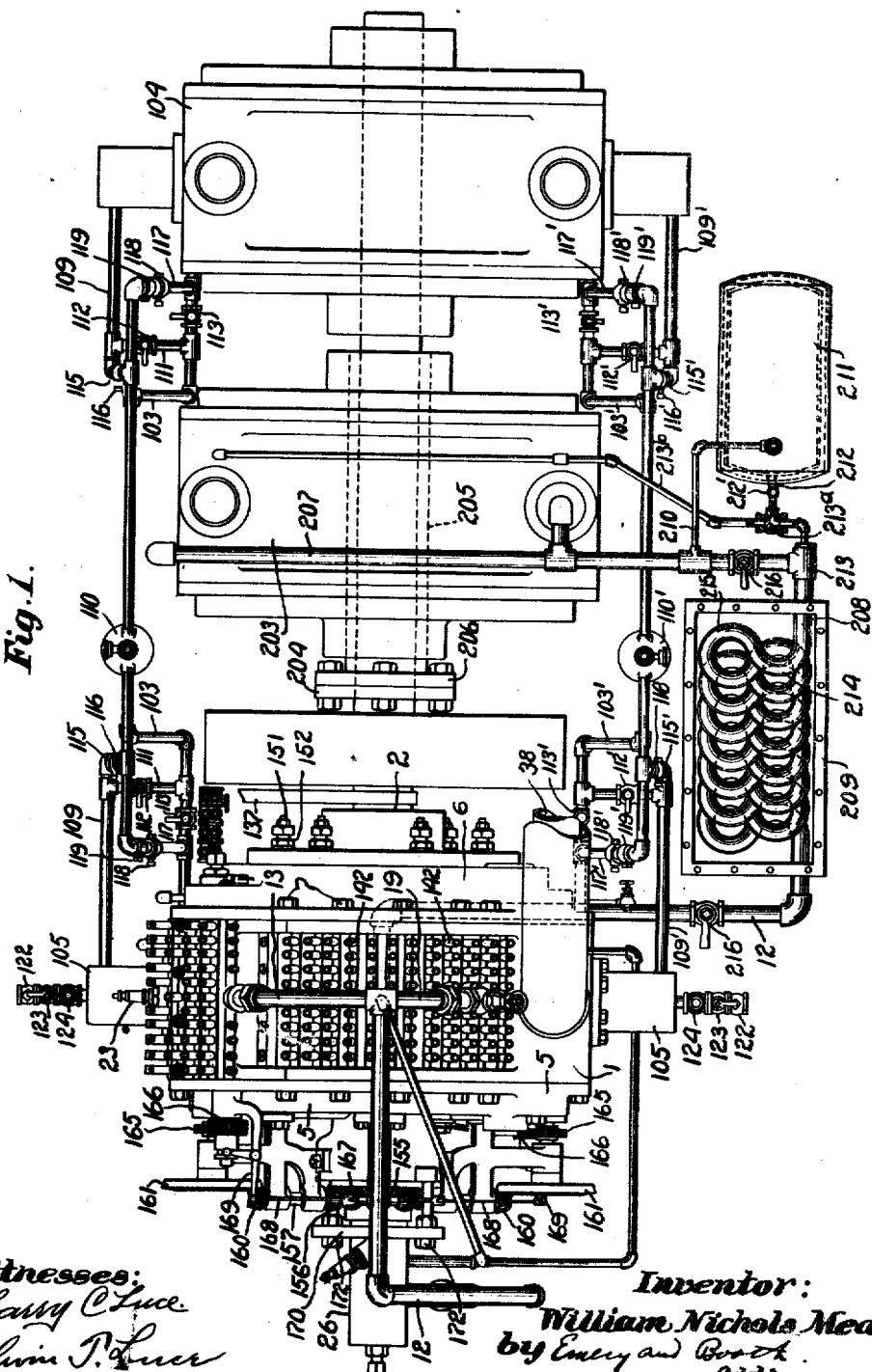
Figure 2:
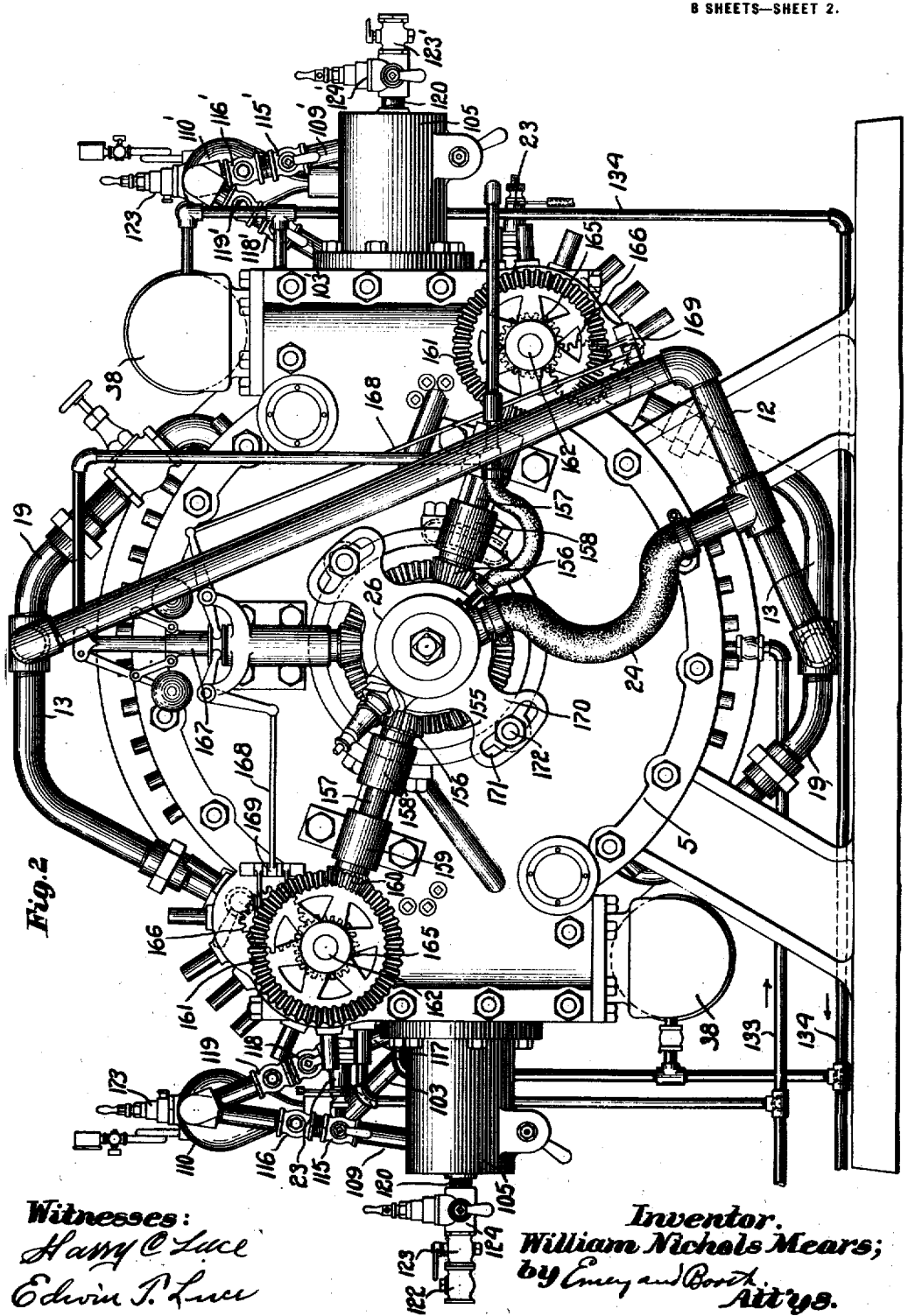
Figure 3:
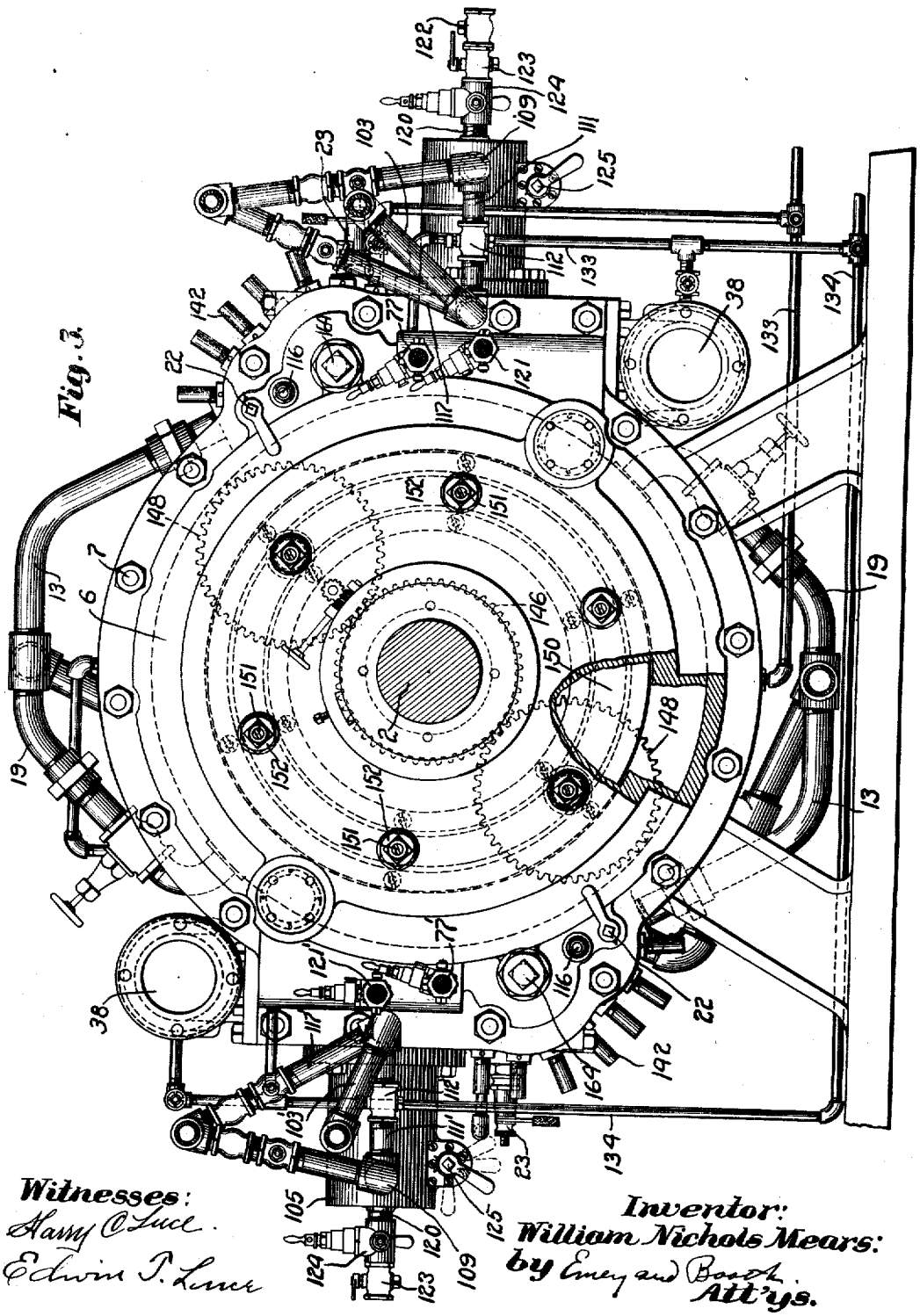

Figure 1 is a top plan view of a rotary internal combustion engine, preferably of the explosive type, embodying one form of my invention, said figure also showing a rotary compressor and rotary pump; Fig. 2 is a front end elevation of the internal combustion engine represented in Fig. 1; Fig. 3 is a rear end elevation of the said engine; Fig. 4 is a longitudinal section of said engine taken upon the irregular line 4—4 of Fig. 5; Fig. 5 is a vertical, central, transverse section thereof; Fig. 6 is an enlarged vertical sectional detail of a portion of one of the abutments of the engine represented in Fig. 5; Fig. 7 is a detail in horizontal section upon the line 7—7 of Fig. 5 showing a portion of an abutment and parts coöperating therewith; Fig. 8 is a detail in vertical section of a modified form of abutment; Fig. 9 is a detail, partially in section, of the regulating and cut out valve coöperating with the abutment; Fig. 10 is a detail representing a modified manner of mounting the abutment shown in Fig. 5; Fig. 11 is a sectional detail taken upon the line 11—11 of Fig. 9 and representing a form of packing that may be employed in connection with the abutment; Fig. 12 is a side elevation of an insulated contact point ignition ring that may be employed in the practice of my invention; Fig. 13 is a vertical sectional view thereof; Figs 14 and 15 are respectively transverse and longitudinal sections representing the internal construction of the storage coil within the reservoir; Fig. 16 is a vertical sectional detail representing the preferred construction of air cooling cylinder; Fig. 17 is a detail in transverse section illustrative thereof; Fig. 18 is a perspective view of the port packing ring preferably employed in conjunction with the rotor shaft and abutment trunnions; Fig. 19 is a perspective view of the rotor packing ring and packing strip; Fig. 20 is a detail perspective view of the said parts disassembled and upon a larger scale; and Fig. 21 is a sectional detail of a modification of one of the explosion or combustion chambers.

Referring more particularly to the single embodiment of my invention herein illustrated, the engine, preferably of the internal combustion type, is provided with a casing and an internal member herein for convenience of description termed a rotor. In the practice of my invention I impart a relative rotary movement to the casing and rotor. Movement of rotation may be imparted to either the casing or the rotor. In the present type of the invention, however, I have represented the rotor as mounted for rotation within the casing, which herein is stationary.

The casing wherein the rotor is mounted may be of any suitable outline in cross section, being either circular or non-circular as is found best adapted to the particular requirement of the type of engine wherein my invention is employed. Referring more particularly to Figs. 2, 4 and 5, the casing, which herein is represented as substantially circular in cross section and as stationary, is represented at 1, it being adapted to receive therein for rotary motion a shaft 2 mounted in suitable bearings 3—3, represented most clearly in Fig. 4. Mounted within the casing 1 upon the shaft 2 and if desired and as shown extending into the head or heads, is a rotor 4 of any suitable type, and inclosing the rotor within the casing are provided suitable heads 5 and 6, both of which are preferably removable from the casing. If desired, however, but one head may be removable, the other being cast with or otherwise integral with the casing.

If the engine, as herein shown, be provided with two removable heads, the latter may be secured to the casing in any suitable manner, as by means of bolts 7 shown in Fig. 3. It is apparent that the head or heads may set into the cylinder or vice versa, and that suitable packing may be employed. In Fig. 4 I have represented the heads 5 and 6 as provided with suitable lips 7—7 extending inwardly and received within corresponding grooves in the casing, any suitable packing 8—8 being inserted at this point. If desired, the lips 7—7 may be formed upon the casing and extend into the head or heads. As shown in said figure, similar lips and packing 9—9 and 10—10 may be employed about the valve to be hereinafter described.

I contemplate the provision in an internal combustion engine having a cylinder, a contained rotor or piston and a combustion chamber, of means to deliver a succession of separately ignited propulsion charges into one and the same expansion or working chamber, thereby to act upon the piston or rotor while the latter is in continuous communication with said expansion or working chamber. It is apparent that this may be accomplished in many different ways. In the present type of my invention, I have disclosed means coöperating for this purpose to deliver such succession of charges into the expansion or working chamber 11 (see Fig. 5) through the casing 1 and also through the rotor 4.

The motive agent or agents may be taken from any suitable source of supply to be hereinafter described and introduced by means of a pipe 12 (see particularly Figs. 1, 2 and 4) into one or more pipes 13—13 (see Figs. 2 and 5) communicating in the present instance through the casing and eventually discharging into the expansion or working chamber 11, of which in the present type of the invention a pair are provided.

I contemplate the provision of one or more combustion chambers within the casing in communication with the described inlet pipe or pipes 13 and with the expansion or working chamber 11. In this type of my invention and as most clearly shown in Fig. 5, I provide opposite or balancing working or expansion chambers 11—11, to which the agent or agents are admitted through the respective pipes 13—13. Inasmuch as these parts are substantially duplicates of each other, it is necessary to describe but one of them in detail; it being understood that the detailed description of one part applies substantially to the other. Suitably formed in the casing is a combustion chamber 14, which may be of any suitable extent and character. If desired this chamber may be formed as a passage or conduit, or the arrangement may be such that the combustion occurs within the valve seated therein, the latter construction being herein illustrated. To that end, I have in said Fig. 5 illustrated a hollow rotary valve 15, preferably composed of opposed longitudinal members connected by suitable heads, said valve being seated for suitable movement within the chamber 14. Admission of the motive agent or agents into the chamber 14 and within the valve is controlled in any suitable manner. It is apparent that instead of employing a rotary valve any other suitable type of valve may be employed to be operated in any desired manner. Herein I have shown a rotary cut-off valve 16 mounted in the casing and preferably continuously rotated by means hereinafter described. Said valve is provided with a port 17 to introduce the agent or agents in successive charges into the combustion chamber 14 and also preferably into a plurality of pockets 18—18, which act to cushion or balance the valve against the increased pressure from the combustion chamber at the periods of explosion. The agent or agents may be introduced directly from the pipe 13 to the port of said valve, or I may provide suitable means for heating said agent or agents and preferably by the engine prior to the admission thereof to said valve, or other combustion chamber, thereby to expand the same. Herein for the purpose I have represented as communicating with the pipe 12 and oppositely extending from the pipe 13, a pipe 19 communicating at 20 with a chamber 21 of suitable extent formed in the casing and itself communicating with the cut-off or admission valve 16. Preferably a plug or other suitable valve 22 is interposed, whereby the agent or agents may be admitted either through the pipe 13 or 19. It is apparent that when admitted into and through the chamber 21 the motive agent is heated and thus expanded prior to its admission to the combustion chamber.

The combustion chamber 14 is provided with a suitable inlet valve, which herein is the valve 16, and with a suitable outlet valve, which may be the valve 15, or other suitable valve which herein is a portion of the abutment coöperating with the rotor and to be hereinafter more fully described. If desired and as herein represented I employ both the valve 15 and said coöperating portion of the rotor, though it will be understood that either may be employed without the other. The agent or agents may be fired within the combustion chamber 14 and valve 15, if the latter be provided, or between the admission and outlet valves of whatever description in any suitable manner, as by means of a spark plug 23.

It will be apparent that from the foregoing description that one of the said series or succession of separately ignited propulsion charges introduced into the working or expansion chamber is delivered into and through the combustion chamber 14. Preferably the other or others of said charges are introduced into and delivered through the rotor. It will be apparent, however, that if desired the admission of the motive agent or agents either through the casing or through the rotor may be used to the exclusion of the other course, if desired. Preferably, however, the agent or agents are introduced through both parts.

In order to introduce the motive agent or agents into the rotor, I have herein (see Figs. 2 and 4) provided a flexible or other pipe 24 leading from the pipe 12 and communicating with and discharging into an annular chamber 25 formed in a stationary but adjustable valve 26 located within and preferably extending axially of the shaft 2. The chamber 25 is provided upon its inner wall with one or more ports 27, permitting the discharge of the motive agent or agents through a similar port or ports 28 formed preferably at one end of a tubular valve 29 having a squared end 30 seated within the shaft 2, so as to rotate therewith, thus intermittently admitting the agent or agents thereinto. Preferably, as shown, the outer end of said tube is somewhat tapered and is received within a correspondingly shaped portion of the valve 26. Throughout the greater portion of its extent the tubular valve 29 is spaced from the interior wall 31 of said valve 26, thus providing an annular combustion chamber 32. In order to admit the motive agent or agents uniformly from the valve 29 into said chamber 32, I preferably perforate the said valve throughout substantially its entire extent as indicated at 33. In this manner a thorough scavenging of the chamber 32, which in this type of my invention is one of the combustion chambers, is effected.

In the event that a plurality of working chambers 11 are provided, the motive agent is delivered to each of them from the chamber 32 through the rotor. In the present type of my invention I have shown such construction. I also contemplate the provision of an additional combustion chamber intermediate the combustion chamber 32 and the working or expansion chamber 11. It will be apparent that if two or more working chambers 11 be provided I may employ such additional combustion chamber coöperating with one or more of such working chambers 11. In the present type of the invention, wherein I have shown two working chambers 11, I have also illustrated two such additional chambers, although it is apparent that but one of them need be employed in certain types of my invention.

Referring more particularly to Figs. 4 and 5, the shaft 2 is represented as provided with substantially opposite ports 34, 34, which are intermittently opened and closed by the rotation of the shaft 2 about the stationary valve 26. Preferably in communication with each port 34 in the valve 2 is an additional combustion chamber 35, formed in the rotor 4 and of suitable extent, said combustion chamber being in communication with the proper working or expansion chamber 11 by means of a port 36 between which and said combustion chamber is a preferably rotary valve 37 controlling the discharge of the motive agent or agents therethrough.

The combustion chamber 32 and the combustion chamber or chambers 35 are scavenged by the incoming motive agent or agents, at which period of operation the ports 34 and 36 are open, whereby the burnt mixtures are forced therethrough past the valves 26 and 37 into the exhaust pipe 38 in the rear of the abutment or abutments, to be hereinafter more fully described.

From the foregoing description, and contemplating for simplicity of description the employment of but a single working or expansion chamber 11, it will be apparent that the motive agent or agents are introduced into the combustion chamber 14, the combustion chamber 32 and the combustion chamber 35 in such a manner that I may, and preferably do, deliver therefrom a succession or series of separately ignited propulsion charges into the said working or expansion chamber 11. Preferably, in each instance the motive agent or agents are introduced into the respective combustion chambers and are locked or confined therein by means of the described valves until the pressure in said chambers substantially equals that in the admission pipe or pipes 12, 13, etc. That is to say, when the motive agent is introduced into the combustion chamber 14 its egress is prevented and it is confined therein by the valve 15 or other suitable means. Similarly, the motive agent introduced into the combustion chamber 35 is confined therein and its egress is prevented by the valve 37, and finally the motive agent introduced into the combustion chamber 32 is confined therein and its egress is prevented by the stationary valve 26. Preferably, the egress valves are operated in the sequence already described. Having closed said egress valves, and prior to the admission of the charges into the several combustion chambers referred to, the admission valves controlling the entrance of the motive agent into said several chambers are closed and preferably in the same sequence. That is to say, prior to ignition of the motive agent in the combustion chamber 14, the inlet valve 16 is closed, thereby controlling admission to said chamber; the valve 26 controlling the admission of the motive agent to the combustion chamber 35 is closed, thereby confining the motive agent therein; and finally the ports 28 in the tubular valve 29 are closed, thereby confining motive agent in the combustion chamber 32. The charges having been thus confined within the several combustion chambers, they are successively fired and preferably in the described sequence, after which the charges are released from said chambers into the working or expansion chamber 11, in the described sequence.

It will be apparent from the foregoing description that the cylinder is provided with a chamber or chambers which may be the combustion chamber or chambers 14, and that said chamber or chambers are scavenged by the incoming motive agent or agents when the admission valve or valves 16 are opened and when the egress valve or valves relating thereto are also opened.

In the present embodiment of the invention I have, as heretofore stated, provided two opposite working or expansion chambers 11, each communicating at the proper time with its exhaust 38, which is preferably provided with an automatic check valve 38ˣ. Having reference to either combustion chamber 14, when the burnt gases are scavenged therefrom by the incoming mixture they are discharged through the port 39 to the forward face of the rotor 4 or face opposite to the working face thereof, and hence when the position of the rotor 4 is such that the said port 39 is in uninterrupted communication with the exhaust, and in the present type of the invention with the opposite exhaust 38. In this manner the said combustion chamber 14 is scavenged at one side of said rotor. Succeeding the scavenging of the chamber 14 in the manner described, the port 39 is closed either by the valve 15 or other suitable means to be hereinafter described. During this time the admission valve 16 has remained open and continues open after the closing of the egress from the chamber 14 until the incoming motive agent fills the same to substantially the pressure within the pipe 13. Thereupon the valve 16 is closed and then the charge within said chamber 14 is fired, after which the port 39 is opened, and the charge is allowed to enter the working or expansion chamber 11 at the working face of the rotor; that is to say, at the face of the rotor opposite that at which the combustion chamber 14 was scavenged, as already described. It will be apparent from the foregoing description that the admission from the port 16 is split, in order to scavenge the cylinder 14 at one side of the rotor and to supply motive fluid at the opposite side of the rotor.

Inasmuch as in this embodiment of the invention I provide two working or expansion chambers 11, I provide likewise a pair of abutments coöperating with the rotor in the formation of the said chambers. While each abutment may be of any suitable construction I preferably, and as shown most clearly in Figs. 5, 6 and 8, provide in a suitable recess 40 in the casing a bearing member 41, preferably tapering in longitudinal section as represented in Fig. 8, and receiving the abutment 42 at the axial line of the trunnions 43, 43 extending from said abutment and preferably received within suitable bearings in the heads of the casing, as represented most clearly in Fig. 8. Preferably, each abutment 42 is provided with a wearing strip 44, secured to the abutment for renewal and engaging its bearing block 41 for rocking movement. The tapering bearing block 41 is provided with suitable means, as for example a screw 45, tapped into the cylinder and passing loosely through a lip 46 upon said bearing block, and between which and the adjacent lip 47 the headed end of the screw is confined, whereby movement of the screw in either direction will move the bearing block axially thereby to take up wear of the parts or adjust the clearance between the abutment and the cylinder.

Preferably, I provide suitable means to supply oil to the face of each bearing block 41. For this purpose I have shown in Fig. 8 a suitable chamber 48, from which the oil under pressure is delivered by suitable passages 49 leading about the adjacent trunnion 43 to the lower face of the bearing block, the latter being provided with a suitable number of oil holes 50, thus supplying oil to the contacting faces of the bearing block and the abutment.

I provide means to retain the oil between the contacting faces of the bearing blocks and abutments. Viewing Fig. 5, it will be apparent that the two abutments 42, 42 are inverted with respect to each other. In this embodiment of the invention, therefore, I shape one of the bearing blocks, as for example that shown at the left in Fig. 5, in such manner that it will receive therein the bearing edge of the abutment and maintain a supply of oil. In the case of the right-hand abutment in Fig. 5, this construction is, in this type of the invention, reversed, the abutment being therein represented as provided with a substantially cup-shaped face 51, wherein is received the tapering edge of the corresponding bearing block 41, the oil being supplied to and maintained upon such cup-shaped face of the abutment.

Preferably, I provide a substantially knife edge engagement of the abutment and its bearing block. In the case of the left-hand abutment shown in Fig. 5, the knife edge is provided upon the abutment but, in the case of the right-hand abutment, the knife edge is in this embodiment of the invention provided upon the bearing block 42. If desired, however, instead of providing substantially a knife edge engagement I may, as shown in Fig. 10, provide either the abutment or the bearing block, or both, with a rocking edge 52, thus affording substantially a rolling contact. It is apparent that the provision of the knife edge or other described engagement of the abutments and the bearing blocks provides centering means for the abutments other than the trunnions 43, which in certain embodiments of my invention may be dispensed with.

Preferably, I provide each abutment, if a plurality thereof be employed, with a shoe, herein represented as fluid-pressed into contact with the surface of the rotor. Referring particularly to Fig. 6, the abutment 42 is represented as provided with a shoe 53, having a preferably elongated socket 54, within which is received a knuckle 55 formed upon the protruding end or rod 56 of a piston 57 received within a piston chamber 58 cored in the abutment. Any suitable means may be provided to pack the piston, as for example a packing ring 59, interposed between the piston and a plate 60 secured to the piston head by a screw 61. Any suitable fluid may be admitted to the piston chamber 58 in the rear of the piston 57, to force the shoe 53 from the abutment. Such fluid or fluids may be introduced in any suitable manner. For example, in Fig. 6 I have represented the face 62 of the abutment as provided with a valved passage 63, leading to a chamber 64 formed in the rear of the piston chamber 58 and communicating therewith through the passage 65. Preferably, within said chamber I provide a suitable check valve 66. To prevent excess of pressure within the chamber 58, I provide a valved relief passage 67, communicating through the chamber 68 and passage 69 with the exterior of the abutment. The chamber 68 is preferably provided with a relief check valve 70. It is apparent that any suitable fluid, which may or may not be the motive agent, may be supplied in the manner described to the chamber 58.

In Fig. 5 I have represented a cushioning chamber 71, provided between the face of the abutment and the casing. If it be desired to introduce the motive agent into the cushioning chamber 71, I may, as shown in Fig. 5, provide a passage 72 leading from the working chamber 11 past said valve to the said cushioning chamber. If desired, I may employ a fluid other than the motive agent for this purpose, in which case the valve 73 may be rotated to close the passages 72 and 75. In such case the desired agent may be introduced through the passage 76 (shown more clearly in Fig. 9), leading from some extraneous source. As shown in Fig. 3, the passage 76 may terminate in a screened inlet 77 and may be provided with suitable check, regulating, safety and cut-out valves, to be hereinafter more fully described in connection with other parts, and one or more of which may be employed as found desirable.

Instead of introducing a fluid through the passage 63 for the purpose described, I may close the valve therein as well as the valve in the passage 67 and introduce a suitable fluid, which may be the motive agent or agents but preferably is oil or some other fluid, from the chamber 78 in the rear of the abutment. In such case I provide a passage 79 leading from such chamber and controlled by a suitable check valve 80 by which the fluid is delivered past the valve 81 into said chamber 58, a relief passage 82 having a suitable relief check valve 83 being provided to prevent excess of pressure in said chamber. In the event that oil be supplied through the passage 79, such passage may be continued as represented at 84 to a point adjacent the under face of the abutment, where it communicates with a passage 85 in the prolongation or rod 56 of the piston 57.

By means of suitable openings 86 the face of the knuckle 54 may be lubricated, and by means of a suitable passage 87 in the shoe 53 the inner face of the latter may be suitably lubricated. It is apparent that the in and out movement of the piston 57 interrupts the flow of oil through the passage 84.

The valve 81 may be so positioned as to supply fluid to the passage 84 as well as to the chamber 58, or either of said passages or both may be closed. Thus if oil be supplied through the passage 79 it may be delivered only to the face of the shoe 53 in the event that a suitable fluid be admitted through the passage 63 to the piston chamber 58.

As shown most clearly in Figs. 5, 6, 8 and 9, each abutment is provided with one or more spokes 88, which may if desired be hollow, to permit the passage of a temperature regulating agent, or for the provision of a suitable vacuum, to be more fully hereinafter referred to.

Prior to the admission of the motive agent to the working chamber 11, a suitable fluid is admitted as previously described or from any suitable source to the cushioning chamber 71, whereby the abutment and its shoe are tightly seated against the face of the rotor in order properly to confine the motive agent to the working chamber 11.

The abutment or abutments may be provided with any suitable packing. Referring more particularly to the modified form of the abutment represented in Fig. 9, I have therein shown packing strips, which may be applied so far as applicable to the form of abutment shown in Fig. 6. In said Fig. 9 I have represented a packing strip 89 at one end of the abutment, a similar strip being employed at the opposite end and preferably connecting strips at the faces, thus surrounding the abutment. If desired these strips may be similar to those shown in my co-pending application, Serial Number 407,235, filed December 19, 1907. In advance of the packing strip 89 I have represented an angular packing strip 90, generally similar to that shown in my copending application Serial Number 420,184, filed March 10, 1908, provided with a stepped end 91 having a pin and slot connection with the stepped end 92 of a packing strip 93 extending to the rotor-contacting face of the shoe 94, and there preferably provided with a head 95 the edge of which also contacts with the rotor, so that in the operation of the engine the shoe and packing wear equally and maintain a tight working connection with the rotor. In order to prevent leakage through the joint afforded by the stepped ends 91, 92, I have provided one of said ends and preferably the end 92 with an underlying lip 96, as most clearly shown in Fig. 11. It is apparent that such construction of packing may be employed wherever suitable, as for example across the cylinder contacting face of the abutment, or it may be applied to one of the strips across the rotor cylinder contacting end. As shown in said figure, I provide suitable means such, for example, as coil springs 97, to force the packing outwardly against the head, though it will be apparent that the oil may be utilized for the purpose. It is apparent that the packing strip 92, with its head 95, constitutes a corner packing between the rotor and the head. In the rear of the shoe 94, and as most clearly shown in Fig. 11, is set a strip 98 preferably spring pressed against the strip 93, to prevent leakage past the latter. The spring pressed strip 98 also serves to force the strip 93 into engagement with the head. It is apparent that any suitable means may be employed for this purpose.

Preferably, the shoe 94, as shown in Fig. 9, is provided with a beveled protruding end 99, to assist the shoe in riding over the packing of the rotor to be hereinafter described. If desired such protruding end may be omitted and the shoe itself beveled for said purpose.

Referring to Fig. 6, it will be noted that the abutment there shown is provided (see dotted lines in said figure) with packing strips 100, 101, similar to the strips 90, 92, and which need not be further described.

I contemplate the provision of an actuating, permanently liquid agent for one or more movable abutments, and preferably I provide a fluid cushion for said agent. It is apparent that if I utilize a plurality of movable abutments, I may provide in conjunction with each of them and unrelated to the other the described liquid agent and fluid cushion acting only upon the appropriate abutment. Preferably, however, I interpose between a plurality of movable abutments fluid means to control the movement of one abutment from another. This may be accomplished in any desired manner. Referring more particularly to Figs. 5 and 7 I have in this type of the invention wherein are disclosed a plurality of movable abutments 42, provided in the rear of each abutment a chamber 102 adapted to contain some suitable fluid which may be a permanently liquid agent, such as oil, or which may be air or other fluid. Preferably the chamber 102, shown in Fig. 7, is connected with a similar chamber in the rear of another abutment or if desired with a plurality of such chambers in any suitable manner, as by means of a pipe 103 (see Figs. 1 and 7). Upon the outward radial movement of the abutment represented in Fig. 7, the fluid contained in said chamber 102 is forced outwardly through the pipe 103 into the other chamber or chambers, thereby to force radially inward such other abutment or abutments, it being apparent that the abutments whose chambers 102 are connected by the pipe 103 are operated in opposite phases. If desired, such oppositely phased abutments may be those acting upon a single rotor or those of distinct rotors contained for example in different apparatus. For example, in Fig. 1, I have shown a rotary pump 104 provided with a rotor and abutments, preferably substantially similar to those illustrated in detail in Fig. 5, or containing the parts thereof essential to the operation of the apparatus as a rotary pump. Viewing said Fig. 1, it will be apparent that the two chambers 102 of the abutments of the engine are connected by pipes 103, 103' with the oppositely phased abutments of the pump 104. Upon outward radial movements of the abutments of the pump, the fluid agent is forced in the opposite direction through the pipes 103, 103', thereby to act upon the abutments of the rotary engine and to force them radially inward at the proper time.

Preferably I utilize in connection with the described fluid agent suitable cushioning means therefor. If an actuating liquid agent, such as oil, be employed in the chamber 102, I then, to accomplish this result, provide a suitable cushioning fluid, such as air, therefor. While this result may be accomplished in any desired manner, I have in Fig. 7 shown a dash pot 105 attached to or formed with the casing and extending therefrom radially beyond the abutment, the inner end of the dash pot being represented as in fluid communication with the chamber 102. Mounted within the dash pot is a piston 106 having suitable packing and provided with a piston rod 107 suitably jointed at 108 to the abutment 42. Extending from the outer end of the dash pot 105 is a pipe 109 in communication with the dome or reservoir 110 (see Figs. 1, 2 and 5). As shown in Fig. 7, the pipe 109 may be connected by a pipe 111 having a valve 112 with the pipe 103, a valve 113 being provided between the pipe 111 and the chamber 112. As shown in Figs. 2 and 5, the pipe 103 is connected as at 114 with the base of the dome or reservoir 110. Within the dome or reservoir 110 I provide a suitable cushioning fluid, such for example as air and which is in constant communication with the oil or other suitable actuating fluid in the pipe 103, and therefore subjects the same to the desired pressure.

I have stated that a suitable actuating liquid agent, such as oil may be contained within the chamber 102 and a suitable cushioning fluid, such as air, within the dash pot 105. I may, if desired, reverse this arrangement and place the oil or other actuating liquid agent within the dash pot 105, in which event the valve 112 in the pipe 111 is opened and the valve 113 in the pipe 103 is closed. If the oil or other actuating agent be received within the dash pot, then the cushioning agent, such as air or other suitable fluid, is received within the chamber 102.

It may at times be desired to raise the pressure within the dome or reservoir 110. For this purpose I may employ any suitable pump or other device, but I may if desired utilize the dash pot 105 for this purpose. As most clearly shown in Figs. 2 and 5, the pipe 109 is provided with a plug valve 115 and a check valve 116. When the valve 115 is open, the outward movement of the piston 106 raises the pressure in the dome or reservoir 110, it being maintained therein by the check valve 116. Inasmuch as I may desire to use air or other cushioning agent in the chamber 102, I have as shown in said Figs. 1, 2 and 5, provided a pipe 117 communicating with the dome or reservoir and with said chamber 102, said pipe containing a plug valve 118 and a check valve 119 corresponding to the valves 115 and 116 in the pipe 109. The arrangement is such that upon outward radial movement of the abutment the cushioning agent in the chamber 102, if such be provided, is forced into the reservoir 110 and the pressure therein raised. It is apparent that in both the chamber 102 and the dash pot 105 I may employ a single fluid, such as air, in which event I may also employ the pipes 109 and 117 for the purpose described.

It is apparent, viewing Fig. 1, that the reservoirs 110, 110' may be employed in conjunction merely with the respective abutments of the rotary engine, in which event by closing suitable valves the pump 104 may be cut off therefrom. In such event, the said reservoirs act as compression chambers to return the abutment or abutments, or force them radially inward.

I may desire to utilize the chamber 102 and dash pot 105 as compression chambers, thereby serving to check the recoil or outward movement of the abutments and to return them. In such event I close the valve 115 in pipe 109, the valve 112 in pipe 111, the valve 113 in pipe 103 and the valve 118 in the pipe 117, thereby cutting off said chambers from all exterior communication. As shown most clearly in Fig. 7, I in such event provide the dash pot 105 and the chamber 102 with fittings 120, 120' having screened ends, one of which is indicated at 121 in Fig. 3. Each of said fittings 120, 120' is preferably provided with a check valve 122, 122', a regulating valve 123, 123', and a safety and cut out valve 124, 124'. The construction of parts is such that upon inward movement of the piston 106 and abutment 42 atmospheric air may be sucked in through said fittings into said chamber 102 and the dash pot 105.

I may provide means for regulating the point of compression of the cushioning agent in the dash pot 105. As shown most clearly in Fig. 5, I have provided the dash pot with a valve 125, the passage wherein may communicate with any one of a series of ports 126, 127 and 128 communicating with the interior of the dash pot at different distances from the inner end thereof. The port in communication with said valve determines the point at which the compression commences in the dash pot during the outward movement of the piston 106, as will be obvious.

In the modified form of abutment represented in Fig. 9, I have provided a substantially similar arrangement for varying the point of compression in the rear of the abutment. Therein I have represented a valve 129, the passage wherein is in communication with any one of the ports 130, 131 or 132 communicating at different radial points with the chamber or space behind the abutment.

If desired, I may employ a temperature regulating agent circulated through pipes and passages not herein necessary to describe, and herein shown as substantially similar to those shown in my co-pending application Serial No. 407,235, December 19, 1907.

In lieu of employing a temperature regulating agent, I may establish a vacuum or partial vacuum within some or all of the pipes and passages previously generally referred to, and which may be utilized to establish such vacuum in conjunction with or adjacent to or about the casing, the rotor, the abutments and the heads or any of said parts. Also, and as shown in Fig. 5, a vacuum may be established about the exhausts 38 and if desired about the inlet pipes 12 and 13 for the motive agent or agents. In the event that I establish such a vacuum about or in conjunction with any or all of said parts, the pipe 133 (see particularly Fig. 5) serving as the general inlet pipe if a temperature regulating agent be employed, is closed. In such event the outlet pipe 134 is used to establish a vacuum, the air contained within the various pipes and passages being exhausted therethrough by any suitable means, such for example, as the pump 135 (see Fig. 5). My invention is not limited to any particular use. It may be employed as an internal combustion engine or may be used in conjunction with steam or in other ways. When, for example, the apparatus is employed in conjunction with steam, a partial vacuum is effected in the described pipes and passages, in which case the vacuum acts as a heat insulating agent. If, on the other hand, the apparatus be employed as in internal combustion engine, the same pipes and passages are employed for a fluid cooling agent, such as air or water. The said pump is herein represented as having a crank shaft 136, driven by a belt 137 (see Fig. 1) from the shaft 2 of the engine, the crank 138 upon said shaft 136 being connected to a flexible diaphragm 139 suitably attached to the walls of said pump and acting in the rotation of the crank shaft 136 to exhaust air into the pump from the described pipes and passages past the check valve 140, and to force the same into the external air past the check valve 141, or into some suitable reservoir not herein necessary to be further described. I may, if desired, provide suitable means to prevent ingress of the external heat to the working parts of the engine, as for example, by bright plating or painting in some light color the necessary parts of the apparatus in such manner as to reflect the external heat.

It is apparent that during the operation of the apparatus the air may be exhausted to any desired extent from the described pipes and passages so as to establish a more or less perfect vacuum about any or all of the described parts.

I contemplate the provision of suitable means to facilitate the radiation of heat from the engine, or if desired from the compressor or the pump shown in Fig. 1. For that purpose, and as shown in detail in Figs. 16 and 17, I have provided the casing of the engine (it being understood that the compressor and pump may be similarly equipped) with a plurality of projecting parts through which the external air may pass. In Fig. 16 I have represented one of said parts as a tube 142, secured to or integral with the casing, as indicated at 143, one or more holes 144 being provided for the entrance of the external air at or adjacent the base of said tube. The air enters at the base as indicated and emerges at the open outer end, as indicated by the arrow in Fig. 16, thereby assisting in the radiation of the heat, it being apparent that the inside as well as the outside of the tubes 142 are thereby cooled. In lieu of a tube, such as indicated in Fig. 16, I may employ ribs or fins of any suitable extent, integral with or attached to the casing and perforated at or adjacent their bases to permit the ingress of air at such point, such ribs being provided with longitudinal passages to permit the egress of air at their more elevated parts. It is apparent that if desired air may be in some suitable manner forced through the tubes 142 or the described ribs or other projections. The tubes 142 may be of any suitable formation, as for example, of spiral contour.

If desired, and as illustrated in Fig. 17, certain of the tubes, projections or ribs or parts thereof may be placed in communication by passages 145 through which the air may freely pass or be forced, as previously referred to. It is apparent that the ribs or fins if of considerable longitudinal extent may be of any desired contour, they being preferably in any case provided with the described passages for air.

The valves 37, 37 controlling the parts 36, 36 (see Fig. 5) are in this embodiment of the invention continuously rotated during the operation of the engine. To effect such movement, I may employ any suitable mechanism. Referring more particularly to Figs.

3 and 4, I have herein illustrated a gear 146, secured to the head 6 by bolts 147 in such manner as to permit slight circumferential adjustment of the gear and consequently of the valves 37. Meshing with the gear 146 are gears 148, 148 keyed upon the axle of each valve 37. In the rotation of the rotor the gears 148, 148 roll upon the stationary gear 146, thereby opening and closing the valves at the proper periods. It is apparent that instead of continuously rotating the valves 37 they may be opened and closed in any suitable manner as, for example, by oscillating them by suitable mechanism.

The valves 37 are preferably slightly tapering, as indicated in Fig. 4, and in order to give more or less clearance, dependent upon the motive agents employed, I provide suitable means axially to adjust said valves and also to take up wear. In said Fig. 4, I have represented the valve stem beyond the gear 148 as provided with a flange 149, embraced between the members of a two-part ring 150, the outer member thereof receiving therein the head of a screw 151 which is itself received within an internally and externally threaded tubular screw 152, adapted to bear at its inner end upon the divided ring 150, so that the valve may be forced inwardly to take up wear. By adjusting the screw 151 axially in either direction the valve 37 may be forced in either direction, to afford more or less clearance for the purpose stated. The screws 151, 152, are provided with suitable check nuts and, if desired, some suitable packing, such as paper, is interposed between the members of the divided ring 150 in order to take up wear. At the opposite end each of the valves 37 is preferably provided with a suitable coil spring 153 and coöperating ball bearings and plates, thereby serving to force the said valves toward the head 6. If desired, the set screw 154 may be provided to regulate the pressure of the spring 153.

The valves 15 within the combustion chambers are in this embodiment of the invention continuously rotated, it being understood, however, that they may be intermittently opened in any suitable manner, as by oscillating them. While any suitable means may be employed for operating them, I have in Figs. 2 and 4 represented a bevel gear 155, fast on the shaft 2 and meshing with bevel pinions 156, 156 upon shafts 157, 157, mounted in suitable bearings 158, 159 extending from the head 5. Said shafts, at their outer ends, are provided with bevel pinions 160, 160, meshing with bevel gears 161, 161 upon the axles 162, 162 of the said valves 15, thereby in this embodiment of my invention continuously rotating them for the purpose described. If desired the axles of said valves 15 may be provided with screws 161ª to afford circumferential adjustment thereof. At one end the valves 15 may be provided when desired with suitable coiled springs 163, 163, coöperating ball bearings, and set screws tending to force the valves toward the head 6. At the opposite end the valves may be provided with suitable ball bearings and, if desired, with adjusting screws 164. The valves 15 in their rotation periodically conceal the spark plugs 23.

In the present embodiment of my invention the inlet valves 16 are continuously rotated, it being apparent that they may be intermittently opened at the proper periods in any desired manner. Herein for the purpose I have represented each shaft 162 (shown in Figs. 2 and 4) as provided with a pinion 165. The said pinions mesh with and drive gears 166, mounted upon said valves 16, thus rotating them in the manner described.

I may desire to advance or retard the periods of opening of the valves 16. While this may be done in any suitable manner, I herein provide suitable means acting preferably automatically, to vary the circumferential position of the gears 166 upon the stems of the valves 16. For that purpose, each valve stem is provided with a helical thread (not shown) so that by axial movement of either gear upon its valve stem its circumferential relation to the valve is altered. While this may be accomplished in any suitable manner, I have in Figs. 1 and 2 indicated a governor 167 connected to said gear by link 168 and bell-crank 169, thereby as shown in Fig. 1 to move it axially upon the axle of its valve 16.

It has previously been stated that the valve 26 is stationary but adjustable. Any suitable means may be provided to adjust said valve circumferentially. In Fig. 2 I have represented the said valve as provided with opposite ears 170, slotted as indicated at 171 for the passage of adjusting bolts 172, by which the valve may be circumferentially adjusted and held in the desired position.

The reservoirs 110, 110' are provided with suitable safety valves, as indicated at 173 (see Fig. 2) and tapped thereinto may be suitable connections whereby the escaping pressure may be utilized to exert pressure upon the oil for lubrication or for other purposes.

Any or all of the valves heretofore described may be provided with suitable chambers for the reception of a temperature regulating agent, or for the establishment of a vacuum, thereby to cool, heat, or insulate them, as may be desired. Such chambers are connected up with the system heretofore referred to in any desired manner, not herein necessary to describe in detail.

The shoe 53 of each abutment 42 may, and preferably does, act at suitable times as a valve to control the port or ports 39. If the said shoes be used for this purpose it is apparent that the said ports may be controlled by said shoes acting as valves and that the valves 15 may be dispensed with. Said shoe or shoes may act in this capacity to open the port or ports 39 to permit the scavenging action, already described, whereupon the shoe or shoes close said port or ports 39 and are again opened at the proper time to permit the entrance of the charge through said port or ports into the working or expansion chamber or chambers 11.

In the event that I employ the modified form of abutment shown in Fig. 9, the toe or projection 94× of the abutment acts as a valve for the port 39 in the manner described with reference to the shoe 53. It is apparent from said figure that the shoe 94 is positioned wholly or partly beneath the projection 94× in such manner that a greater pressure is exerted on the outer side of said projection than upon the opposite side thereof, thereby holding it in contact with the shoe.

In certain instances, as in the event of employing my invention in conjunction with a compound engine, I may dispense with all the valves referred to in this connection, excepting the shoe 53 or similar part.

In Figs. 12 and 13, I have represented the means preferably employed by me to explode the charges within the rotor. For that purpose, I have therein shown an insulating ring 174 secured to the inner face of one of the heads, as for example the head 5, in any suitable manner. The said ring is provided with a wire 175 insulated thereby and having firing contacts or terminals 176. Suitable means, as for example springs 177, may be provided to preserve the proper relation of the ring and the end of the spark plug or plugs. The ring 174 may be circumferentially adjusted in any suitable manner to vary the time of firing.

The abutment or abutments may be provided with suitable means for oiling the packing strips and hence the contacting portions of said abutments. For example, in Fig. 9, I have shown the modified form of abutment as provided with an oil passage 178 receiving oil from any suitable source and conveying it through passages 179 and 180 under the respective packing strips and to the shoe 94. Preferably I provide a check valve 181 in the passage 180 to prevent the oil from being forced back by the explosion.

Preferably the rotor 4 is provided with suitable packing means. Referring more particularly to Figs. 5, 7, 19 and 20, I have therein represented split rings 182, 183 and 184 seated in suitable channels and encircling one or both ends of the rotor and corresponding substantially to the rings illustrated in my co-pending application No. 420,184, filed March 10, 1908. As shown in Fig. 7, at the right hand end of the rotor but two packing strips may be employed. In the event that I employ two sets of packing rings, such, for example, as illustrated in Fig. 7, I connect them in suitable manner, as for example by packing strips 185, 186 of substantially the cross sectional shape illustrated in Figs. 5 and 20. That is to say, the packing strip 186 is substantially wedge shape upon the side adjacent the strip 185, and is also preferably slightly tapered upon its opposite edge contacting with the rotor. Preferably both strips 185 and 186 are forced radially outward by springs 187 (see Fig. 5). The strip 186 tends to force the packing strip 185 against the wall of the channel in the rotor wherein said strips are seated, thus preventing leakage under or past said packing. As shown in Fig. 5, the strip 185 may be provided with a longitudinal lip 187, against the under side of which the motive agent may act to force it outward.

Between the ends of the split ring 182 I interpose a wedge 188 preferably recessed as indicated at 189 for the reception of the adjacent parts of the packing strips 185, 186. It will be apparent that in this manner the ring 182 is prevented from rotating independently of the rotor. The forward edges 190, 190 of the wedge are shown as extending to the outer face of the rings 182, 184, thereby completing the said packing rings. As the packing rings wear and expand, it is apparent that the wedge 188 is forced outward by the spring 191, thus preserving a complete encircling wearing surface, the edges 190, 190 of the wedge wearing off with the packing rings. It is apparent that the wedge 188 may be used in connection with a single packing ring.

Preferably I provide suitable means to tie together the ends of the packing ring 182. Herein for the purpose I have shown the ends of said ring as provided with dovetails 192, 192 parallel with the adjacent edge thereof. In the present instance, said dovetails are inclined to correspond to the inclination of such edge. Upon the wedge 188 are provided ribs 193, 193 entering said dove tails 192 and corresponding in inclination thereto. It will be apparent that the ribs 193, 193 prevent circumferential separation of the ends of the packing strip 182 and also that they prevent movement of the wedge crosswise of said packing strip. The wedge 188 serves thoroughly to pack the corners and two surfaces of the ends of the split ring 182, thereby entirely preventing leakage. If desired, a packing strip 194 may be seated in suitable notches in the strips 185, 186 to bear upon the inside of the head or cylinder to minimize centrifugal wear upon the strips 185, 186.

In conjunction with the abutment or abutments 42, I preferably provide one or more strips 194ª (see Figs. 5 and 8) formed as continuations of the casing or attached to the heads, setting into the exhaust 38 and extending nearly to the rear of the abutments 42. Preferably I employ two such projections in connection with each abutment adjacent the spokes 88 thereof. In the rotation of the rotor 4, said projections act upon the packing strips 185, 186 upon the rotor to prevent outward movement thereof when passing the exhaust.

Preferably I provide about the shaft 2 and about the trunnions 43 of the abutments suitable packing means to prevent leakage of the temperature regulating agent or to prevent impairment of the vacuum. For that purpose, I have as represented in Figs. 8 and 18 provided a port packing ring 195. Said ring is in Fig. 18 shown as an integral structure composed of annular end members 196, 196 connected by cross members 197, the latter being preferably recessed, as indicated at 198. If desired, however, the packing ring may be composed of separate parts suitably connected together. In use, the described ring is applied to the desired part, as for example to a trunnion 43, such as shown in Fig. 8, or to the shaft 2, soft packing rings 199, 199 being preferably positioned at opposite sides thereof. A coiled spring 200 and adjusting screw 201 may also be employed to regulate the tension upon the spring. The described ring prevents leakage along the shaft or the trunnion at opposite sides of the protected port, so that in the event a temperature regulating agent be employed, leakage thereof is prevented, or in the event that I desire to establish a vacuum, impairment thereof is likewise prevented. Circulation is established through the recesses 198 and through the openings 202 between the cross members 197.

The motive agent or agents may be supplied from any suitable source. In Fig. 1, I have represented a compressor 203 fast but circumferentially adjustable upon the shaft 2. For that purpose, I have represented the shaft 2 as provided with a collar 204 and the compressor as provided with a hollow shaft 205 mounted upon the shaft 2 and provided with a collar 206, which may be bolted in any position of circumferential adjustment to the collar 204. Upon the hollow shaft 205 is secured a piston of any suitable character, as for example the rotor hereinbefore described, or the necessary features thereof. It is apparent that by circumferential adjustment of the hollow shaft 205 the said piston is circumferentially adjusted with respect to the compressor casing 203. In this manner the adjustment may be such that the point of greatest compression of the rotor may be coincident with the point of greatest energy of the engine. It is apparent that the compressor 203 may be either of the reciprocating or rotary type and that the part mounted upon the shaft 205 may be either a piston or a rotor as required.

I introduce into the compressor 203 any suitable fluid, such for example as air to be forced therefrom and subsequently united with or sprayed by some suitable fluid, or I may introduce a suitable mixture into the compressor 203, such mixture being produced by spraying, carbureting or in other suitable manner. I have herein illustrated the introduction of air into the compressor and the subsequent mixing therewith of gasolene and any other suitable agent. For the purpose I have represented a pipe 207 leading from the compressor and delivering air under pressure into a coil 208 within a suitable reservoir 209, preferably containing some suitable temperature regulating agent or in which a vacuum may be established in any suitable manner. I have also shown the pipe 207 as tapped, as indicated at 210, into the top of the tank 211, thereby to force fuel through the pipe 212 to the spraying nozzle 213, thereby mixing the fuel with the air in a manner not necessary to further describe. Between the pipe 212 and spraying nozzle 213 I have interposed a valve 213ª, by turning which in the opposite direction I may deliver the fuel through the pipe 213ᵇ into the compressor 203 for spraying it or for delivering the same to the carbureter.

I contemplate the employment of non-mechanical means for keeping the air and fuel constantly mixed. I have discovered that by the employment of a coil of any suitable shape, as for example circular or of substantially figure 8 shape, the kerosene or other fuel is prevented from separating from the air and depositing itself at the bottom of the coil. This is effective for the purpose, because the kerosene or other suitable fuel being heavier than air tends to occupy the more remote side of the coil under all conditions while in motion. For example, referring to Fig. 1, the incoming kerosene is driven to the more remote side 214 of the lower portion of the first portion of the coil, but as it rises it crosses the upper portion of the coil to the part 215 thereof and hence the mixture thereof with the air is maintained. This operation is repeated in each part of the coil. Preferably the coil is of curved contour substantially throughout, so as not to retard the progress of the kerosene or other fuel and further to facilitate the mixing thereof with the air. The mixed air and fuel pass from the coil 208 into the inlet pipe 12. If desired, a check or a check and reducing valve 216 may be provided in the pipe 12 between the coil and the engine to prevent back firing and to reduce pressure. If desired, a check valve 216' may be placed in the pipe 207 between the compressor 203 and the reservoir 209 to prevent return of the air into the compressor and into the tank 211. A check valve 212' may be placed in the pipe 212 between the valve 213 and the said tank.

If desired, I may provide the coil 208, whatever be its shape, with suitable means to enforce or complete the mixing of the air and fuel. For that purpose I have, in Figs. 14 and 15, represented the coil as provided with interior projecting fingers 217 which may extend normal to the surface of the tube, pipe or coil. Preferably, I also provide vanes or baffle pieces 218 inclined in the direction of travel of the air and fuel therethrough to prevent pocketing. These vanes or baffle pieces may be if desired perforated as represented at 219 or provided with slits 220.

In Fig. 21, I have shown a modified construction of combustion chamber within the casing. In said figure, I have represented a combustion chamber 221 of suitable extent formed in the casing and positioned between a rotary cut-off valve 222 and another valve 223. If desired, in lieu of the valve 223, I may employ a valve 224 which may be the shoe or toe upon the adjacent abutment heretofore described. Within the chamber 221 is the sparking plug 225. The elongated formation of the combustion chamber 221 affords better scavenging thereof. Said chamber is provided with a swell 226 and an opposite recess 227 serving to direct the incoming motive agent so as to effect a better scavenging of said chamber. Otherwise the operation of the parts is substantially the same as that heretofore described with reference to Fig. 5.

As shown most clearly in Fig. 4, I provide preferably in each head 5 and 6 wearing strips 229, 229' adjacent and contacting with the packing strips provided in the rotor at opposite ends thereof. It is apparent that these wearing strips may be provided upon the casing itself if the related construction and head is such that such construction may be utilized.

Viewing Fig. 5, it will be apparent that the outer ends of the chambers 71—71 and 78—78 are substantially rounded. These chambers are formed in the casing and the described contour may readily be imparted by a cutting tool. Were not the rounded conformation given, it would be necessary to use a planer. Hence in the preferred form of the invention I am enabled to provide a cheaper construction.

Having thus described one type or embodiment of my invention, I desire it to be understood that although specific terms are employed, they are used in a generic and descriptive sense and not for purposes of limitation, the scope of the invention being set forth in the following claims.

Claims:

1. An engine comprising in combination a cylinder, its rotor, a fluid admission port and means to scavenge it through that portion of said cylinder which is at the opposite side of said rotor from that at which motive power is admitted thereto through said port.

2. An engine comprising in combination a cylinder, its rotor, an admission port and means to split the admission from said port to scavenge through the cylinder at one side said rotor and to supply motive fluid at an opposite side thereof.

3. An engine comprising in combination a cylinder, its rotor, an abutment and means independent of said rotor and carried by the abutment separately to control the scavenging period and initial admission of fresh fluid.

4. An engine comprising in combination a cylinder, its rotor, an abutment, fluid controlled packing means between said abutment and rotor, and means to admit fluid to render effective said packing means in advance of the main admission of fluid to said cylinder for propulsion purposes.

5. An engine comprising in combination a cylinder, its rotor, an abutment, and means intermittently to admit fluid to establish effective contact between said abutment and rotor in advance of the principal admission of fluid to said cylinder for propulsion purposes.

6. An engine comprising in combination, a cylinder, its rotor, a confined combustion chamber between the shaft and the periphery of the rotor, and means to furnish a confined charge of fluid in said chamber and to ignite said charge before releasing it.

7. In a rotary engine the combination of a cylinder, a rotor, a working chamber wherein each of a succession of charges is separately confined and expanded, and means to deliver a succession of separately ignited propulsion charges into one and the same working chamber to act upon the piston while the latter is in continuous communication with said working chamber.

8. An engine comprising in combination, a cylinder, its rotor, a combustion chamber, and means to deliver a succession of propulsion charges into a single pocket in said chamber between its wall and the rotor contacting therewith at a plurality of spaced points throughout to form a plurality of pockets, to act upon said rotor while the latter is in continuous communication with said chamber.

9. An engine comprising in combination a cylinder, its rotor, a combustion chamber, means to deliver a succession of propulsion charges into a single pocket in said chamber between its wall and said rotor to act upon said rotor while the latter is in continuous communication with said chamber, and means to ignite said charges.

10. An engine comprising in combination a cylinder, its rotor, a fluid supply through said rotor, one or more valves to confine the fluid supply in the rotor and means to ignite said fluid while the latter is confined in said rotor.

11. An engine comprising in combination a cylinder, its rotor, one or more valves to confine the fluid supply in the rotor, fluid supply means both through and external to said rotor, and ignition means for the fluid while confined in said rotor.

12. An engine comprising in combination a cylinder, its rotor, and means to produce a succession of ignition impulses within said rotor and in communication with said cylinder.

13. An engine comprising in combination a cylinder, its contained, cylinder-contacting rotor, and means to furnish a confined charge of fluid within a chamber in said rotor, means to confine said charge therein and to ignite said charge before releasing it.

14. An engine comprising in combination a cylinder, its rotor, a movable abutment, and a fluid-pressure-controlled shoe movably mounted on said abutment.

15. An engine comprising in combination a cylinder, its rotor, a movable abutment, a fluid-pressure-controlled shoe movably mounted on said abutment, and automatic relief means for the pressure-control of said shoe.

16. An engine comprising in combination a cylinder, its rotor, a movable abutment, a fluid-pressure-controlled shoe movably mounted on said abutment, automatic relief means for the pressure-control of said shoe, and means to limit the degree of pressure effectively applicable to said shoe.

17. An engine comprising in combination a cylinder, its rotor, a movable abutment, a port offset from said abutment, and means carried by the abutment and movable independently thereof to operate as a valve for said port.

18. An engine comprising in combination a cylinder, its rotor, a movable abutment, a port, and an offset valve toe on said abutment to coöperate with said port.

19. An engine comprising in combination, a cylinder, its rotor, means for supplying motive fluid interiorly thereof, and an abutment having an extension toe and a contact shoe carried by said abutment and situated partly under said extension toe.

20. An engine comprising in combination a cylinder, its rotor, a port, a movable abutment having an offset valve toe, and a shoe thereon.

21. In a rotary power transforming device the combination of a plurality of rotors, to and fro movable abutments coöperating therewith, and fluid means interposed between a plurality of said abutments to control the movements of one from another.

22. In a rotary power transforming device the combination of a plurality of rotors, to and fro movable abutments coöperating therewith, and fluid means interposed between a plurality of said abutments to cause concordant movement thereof.

23. In a rotary power transforming device the combination of a cylinder, its rotor, a movable abutment, a mechanical actuating element therefor, and a fluid transmission body interposed between said actuating element and said abutment for moving the latter by the former.

24. In a rotary power transforming device, the combination of a cylinder to receive a working fluid, its rotor, a movable abutment, an actuating, permanently liquid agent therefor independent of said working fluid, and means to provide a cushion for said agent.

25. In a rotary power transforming device, the combination of a cylinder to receive a working fluid, its rotor, a movable abutment, an actuating, permanently liquid agent therefor independent of said working fluid, and means to provide a fluid cushion for said agent.

26. In a rotary power transforming device, the combination of a cylinder to receive a working fluid, its rotor, a movable abutment, an actuating, permanently liquid agent therefor independent of the said working fluid, means to provide a fluid cushion for said agent, and means to supply fluid to said cushion.

27. In a rotary power transforming device the combination of a cylinder, its rotor, a movable abutment, an actuating permanently liquid agent therefor, means to provide a fluid cushion for said agent, and means utilizing the abutment movement to supply fluid to said cushion.

28. In a rotary power transforming device, the combination of a cylinder to receive a working fluid, its rotor, a movable abutment, an actuating liquid agent therefor independent of said working fluid, and means to provide automatic relief for said agent.

29. An engine comprising in combination a cylinder, its rotor, a to and fro movable abutment, means to move it, and means to provide a variable cushion therefor including a closed chamber and a movable piston therein connected to said abutment.

30. An engine comprising in combination a cylinder, its rotor, a to and fro movable abutment, means so to move it, and a variable-effect dash pot cushion cushion therefor between the abutment and the casing.

31. An engine comprising in combination a cylinder, its piston, a combustion chamber of substantially uniform cross-sectional area throughout its length, said chamber being elongated and substantially parallel to the surface of the cylinder, and a valve controlling entrance to said chamber, the valve opening of said valve being substantially coextensive in cross-sectional area with that of said chamber.

32. An engine comprising in combination a cylinder having heads, its rotor, a to and fro movable abutment, packing means thereon between the ends of the abutment and the cylinder heads, and an oscillatory shoe on said abutment for contact with said rotor and having oscillations independent of and relative to said packing means.

33. An engine comprising in combination a cylinder, its rotor, a to and fro movable abutment, packing means thereon cooperating with said cylinder and rotor, and an oscillatory shoe on said abutment and oscillating relative to said packing means.

34. An engine comprising in combination a cylinder, its rotor, a to and fro movable abutment, packing means thereon, an oscillatory shoe on said abutment for contact with said rotor and having oscillations independent of and relative to said packing means, and additional packing means interposed between said shoe and said first mentioned packing means.

35. An engine comprising in combination a cylinder, its rotor, a to and fro movable abutment, a compression chamber behind said abutment, and packing means carried by the abutment and coacting to effect a tight joint between said abutment and chamber and heads.

36. An engine comprising in combination a cylinder, its rotor, ignition means on and movable with said rotor, statonary means having traveling contact with said ignition means and means to confine combustion fluid within the rotor at the period of ignition thereof.

37. An engine comprising in combination a cylinder, its rotor, ignition means on and movable with said rotor, stationary means having movable connection with said ignition means and means to confine combustion fluid within the rotor at the period of ignition thereof.

38. An engine comprising in combination a cylinder, its piston and ignition means on said piston, means utilizing the piston travel to render said ignition means periodically effective and means to confine combustion fluid within the rotor at the period of ignition thereof.

39. An engine comprising in combination a cylinder, its rotor, a to and fro movable abutment having a polygonal end remote from the rotor and packing means for the faces of said polygonal end of the abutment.

40. An engine comprising in combination a cylinder, a rotor therein, a shaft for said rotor, a packing ring for said shaft and composed of relatively hard material, relatively soft packing, and means to press the latter into packing contact with opposite sides of said packing ring.

41. An engine comprising in combination, a cylinder, a rotor therein, one or more to and fro movable abutments coöperating therewith and provided with trunnions, a packing ring for one or more of said trunnions and composed of relatively hard material and relatively soft packing, and automatic means to take up wear of said packing ring.

42. An engine comprising in combination a cylinder, a rotor therefor, a shaft therefor, a packing ring for said shaft composed of relatively hard material and relatively soft packing, and automatic means for taking up wear of said packing ring.

43. In a rotary power transforming device, the combination of a rotor, a plurality of to and fro movable abutments coöperating therewith, and fluid means interposed between said abutments to control the movements of one with another.

44. An engine comprising in combination a cylinder, its rotor, a valve in the latter and rotated thereby, and stationary adjusting means for adjustment of said valve.

45. An engine comprising in combination a cylinder, its rotor, a valve in the latter and revolved thereby, and stationary adjusting means for adjustment of said valve and with which said valve has traveling contact.

46. An engine comprising in combination a cylinder, its rotor, axial means to supply fluid within said rotor, and means to distribute the fluid so supplied throughout the length of said axis for a distance exceeding the width of said rotor.

47. An engine comprising in combination a cylinder, its rotor, and an axial supply pipe provided with discharge openings distributed along a considerable portion of the length thereof at least equaling the width of said rotor.

48. An engine comprising in combination a cylinder, its rotor, a normally stationary axial valve, and means to adjust it rotatively, to vary the point of admission of the motive agent in a single direction of rotation of the engine.

49. An engine comprising in combination a cylinder, its piston, having movement in a circular path, and a packing ring for said piston, said ring having a circulation-permitting recess.

50. An engine comprising in combination a cylinder, its piston, having movement in a circular path, and a packing ring for said piston having a continuous circulation-permitting recess therein.

51. An engine comprising in combination a cylinder, its piston, having movement in a circular path, a packing ring for said piston of relatively hard material, relatively soft packings, and means to press the latter into packing contact with opposite sides of said packing ring.

52. An engine comprising in combination a cylinder, its piston, having movement in a circular path, and a spring-controlled packing ring therefor having a circulation-permitting recess.

53. An engine comprising in combination a cylinder, its piston, a valve exposed at one side to a greater pressure than at an opposite side, and a valve balancing pressure chamber opposed to said greater pressure and in communication with said cylinder.

54. An engine comprising in combination a cylinder, its piston, a valve exposed at one side to a greater pressure than at an opposite side, and a valve balancing pressure chamber opposed to said greater pressure and taking supply from the said greater pressure, said balancing pressure chamber being in communication with said cylinder.

55. An engine comprising in combination a working chamber, its piston, a valve exposed at one side to a different pressure than at its opposite side, and a valve balancing pressure chamber opposed to said different pressure and taking supply from the said working cylinder.

56. An engine comprising in combination a cylinder, its rotor, a packing member and means to move it bodily radially to pack the rotor to said cylinder, and means to impart outward displacement of said packing member to pack it in the rotor which carries it.

57. An engine comprising in combination a cylinder, its rotor, a packing member and means to move it bodily radially to pack the rotor to said cylinder, and means to impart outward displacement of said packing member to pack it to prevent escape of fluid past the same.

58. An engine comprising in combination a cylinder, a rotor, a split packing ring for the latter, a wedge member between and to spread the ends of said split ring, and means between said wedge and a ring end to prevent lateral displacement of the two.

59. An engine comprising in combination a cylinder, a rotor, a split packing ring for the latter, a wedge member between and to spread the ends of said split ring, and means between said wedge and a ring end to cause relative wedging movement to produce also relative side movement thereof.

60. An engine comprising in combination a cylinder, its rotor, a split packing ring for the latter, a wedge to spread the ends thereof, and a transverse packing member resting in said wedge.

61. An engine comprising in combination a cylinder, its piston having a combustion chamber and means to scavenge said chamber at one side only of said piston.

62. An engine comprising in combination a cylinder, a rotor rotating therein and provided with a combustion chamber and means to scavenge said chamber at one side only of said piston.

63. An engine comprising in combination a cylinder, a rotor therein, and means to deliver an interrupted supply of fluid to said rotor first for scavenging and later for motive power.

64. An engine comprising in combination a cylinder, its piston, an ignition chamber other than said cylinder and abutment means controlling the communication between said chamber and cylinder to deliver a successively interrupted supply of fluid to said cylinder.

65. An engine comprising in combination a cylinder, its rotor, an abutment, and fluid controlled packing means between the contacting faces of said abutment and rotor.

66. An engine comprising in combination a cylinder, its rotor, an oscillatory member operating in conjunction with said rotor, and lubricant-retaining coöperating bearing members for said oscillatory member, having a knife edge engagement.

67. In a rotary power transforming device the combination of a rotor, to and fro movable abutments coöperating therewith, and fluid means interposed between said abutments to control the movements of one from another.

68. In a rotary power transforming device the combination of a rotor, to-and-fro movable abutments coöperating therewith and fluid means interposed between a plurality of said abutments to cause concordant movement thereof.

69. An engine comprising in combination a cylinder, its rotor, a valve in the latter and rotated thereby but eccentric to the axis thereof, and means for adjusting said valve rotatively and with relation to said rotor.

70. An engine comprising in combination a cylinder, a rotor therein, one or more to-and-fro movable abutments coöperating therewith and provided with trunnions, a packing ring for one or more of said trunnions and composed of relatively hard material, relatively soft packing, and means to press the latter into packing contact with opposite sides of said packing ring.

71. An engine comprising in combination a cylinder, its rotor, a packing member upon a circumferential end of the rotor, and means to impart circumferential displacement to said packing memer to pack it in the rotor which carries it.

72. An engine comprising in combination a cylinder, a channeled rotor, and a plurality of packing members therein, one of said members acting laterally to displace another to pack it in said channel.

73. An engine comprising in combination a cylinder, a channel rotor, a packing member therein and means to displace said member, thereby laterally to pack it against a wall of said channel.

74. An engine comprising in combination a cylinder, its rotor, an oscillatory member operating in conjunction with said rotor, and coöperating knife edge bearing members for said oscillatory member, one of said bearing members being cup shaped to receive the other and position it.

75. An engine comprising in combination a cylinder, its rotor having suitable packing, a to-and-fro movable abutment, an adjacent exhaust passage, and a member or members in the exhaust to prevent displacement of said packing.

76. An engine comprising in combination a cylinder, its rotor, having suitable packing, a to-and- fro movable abutment, an adjacent exhaust passage, and a member or members in the exhaust to prevent displacement of said packing into the exhaust passage.

77. A power transforming device comprising in combination a cylinder, its piston, and means to admit motive fluid mixture to said device and including a chamber having one or more internal projecting fluid mixing portions having suitable openings for the passage of the motive fluid.

78. A rotary engine comprising a casing and heads, and a relatively rotatable rotor mounted within the casing and provided with packing strips and one or more wearing strips within the heads and opposed to and contacting with said packing strip or strips.

79. A rotary engine comprising a casing, heads therefor, a relatively rotatable rotor within the casing, one or more abutments coöperating with said rotor, and a compression chamber between said abutment and the casing having a curved end formed by a cutting tool.

80. An engine comprising in combination a cylinder, its piston, a combustion chamber, a valve for admitting motive agent to said combustion chamber, said valve having two substantially opposite lateral ports, and a passage in the valve casing and in communication with said combustion chamber, said lateral ports being adapted to establish communication directly between said valve and the combustion chamber and also indirectly through said passage, to establish equal pressure upon the valve.

81. An engine comprising in combination a cylinder, its piston, a combustion chamber, a valve for admitting motive agent to said combustion chamber, said valve having two substantially opposite lateral ports, and a passage in the valve casing and in communication with said combustion chamber, said lateral ports being adapted to establish communication directly between said valve and the combustion chamber and also indirectly through said passage, to establish equal pressure upon the valve, the said passage being placed in communication with said valve through one of said lateral ports slightly prior to the establishment of communication directly through the other port and said combustion chamber, thereby to scavenge said passage.

82. An engine comprising in combination a cylinder, its piston, a working chamber, a valve for admitting motive agent to said working chamber, said valve having a lateral port adapted to establish communication directly between said valve and the said working chamber, and a passage in the valve casing in communication with said working chamber and leading to a lateral wall of said valve substantially opposite the said lateral port, whereby equal pressure may be established upon opposite sides of said valve.

83. An engine comprising in combination a cylinder, its rotor, a to and fro movable abutment, packing means thereon at the meeting angle of the abutment and cylinder heads, and an oscillatory shoe on said abutment for contact with said rotor and having oscillations independent of and relative to said packing means.

84. An engine comprising in combination a cylinder, its rotor, a to and fro movable abutment, a compression chamber behind said abutment and packing means around that end of the abutment that is adjacent to said chamber.

85. An engine comprising in combination, a cylinder, a rotor therein, means to deliver a supply of fluid to said rotor, and an abutment having an extension upon its face to interrupt said fluid supply.

86. An engine comprising in combination a cylinder, a rotor therein, means to deliver a supply of fluid to said rotor, and a movable abutment having an extension upon its face positioned to contact with the rotor between the inlet for the motive fluid and the discharge for the burnt mixture, thereby to separate said motive fluid from the burnt mixture.

87. An engine comprising in combination, a cylinder, a rotor therein, means to deliver a supply of fluid to said rotor, and an abutment movable to intercept said fluid supply having an extension upon its face, so as first to scavenge the cylinder and then to supply motive fluid thereto.

88. An engine comprising in combination a cylinder, its rotor, a confined combustion chamber between the shaft and the periphery of the rotor, one or more abutments engaging the rotor, and means to furnish a confined charge of fluid in said chamber and to ignite said charge before releasing it.

89. An engine comprising in combination a cylinder, a rotor therein, means to deliver a supply of fluid to said rotor and an abutment having fluid supply interrupting means upon its face.

90. An engine comprising in combination, a cylinder, a rotor therein, means to deliver a supply of fluid to said rotor, and a plurality of abutments having rotor contacting, face formations to interrupt the fluid supply.

91. An engine comprising in combination, a cylinder, a rotor therein, means to deliver a supply of fluid to said rotor, an abutment having fluid supply interrupting means upon its face, and cushioning means for said abutment.

92. An engine comprising in combination, a cylinder, its rotor, a fluid admission port, and means to scavenge said port through the cylinder.

93. An engine comprising in combination, a cylinder, its rotor, a fluid admission port, and means to scavenge said port through the side of the cylinder opposite thereto.

In testimony whereof, I have signed my name to this specification, in the presence of two subscribing witnesses.

WILLIAM NICHOLS MEARS.

Witnesses:
 IRVING U. TOWNSEND,
 M. H. LOWRY.

to scavenge the cylinder and then to supply motive fluid thereto.

88. An engine comprising in combination a cylinder, its rotor, a confined combustion chamber between the shaft and the periphery of the rotor, one or more abutments engaging the rotor, and means to furnish a confined charge of fluid in said chamber and to ignite said charge before releasing it.

89. An engine comprising in combination a cylinder, a rotor therein, means to deliver a supply of fluid to said rotor and an abutment having fluid supply interrupting means upon its face.

90. An engine comprising in combination, a cylinder, a rotor therein, means to deliver a supply of fluid to said rotor, and a plurality of abutments having rotor contacting, face formations to interrupt the fluid supply.

91. An engine comprising in combination, a cylinder, a rotor therein, means to deliver a supply of fluid to said rotor, an abutment having fluid supply interrupting means upon its face, and cushioning means for said abutment.

92. An engine comprising in combination, a cylinder, its rotor, a fluid admission port, and means to scavenge said port through the cylinder.

93. An engine comprising in combination, a cylinder, its rotor, a fluid admission port, and means to scavenge said port through the side of the cylinder opposite thereto.

In testimony whereof, I have signed my name to this specification, in the presence of two subscribing witnesses.

WILLIAM NICHOLS MEARS.

Witnesses:
IRVING U. TOWNSEND,
M. H. LOWRY.

---

Corrections in Letters Patent No. 1,192,665.

It is hereby certified that in Letters Patent No. 1,192,665, granted July 25, 1916, upon the application of William Nichols Mears, of Brookline, Massachusetts, for an improvement in "Rotary Power-Transformers," errors appear in the printed specification requiring correction as follows: Page 12, line 118, claim 8, after the word "rotor" insert the words *contacting therewith at a plurality of spaced points thereby to form a plurality of pockets,;* same page and claim, commencing with the word "contacting", lines 121–122, strike out all to and including the word "pockets" and the following comma, line 124; and that the said Letters Patent should be read with these corrections therein that the same may conform to the record of the case in the Patent Office.

Signed and sealed this 10th day of October, A. D., 1916.

[SEAL.]

R. F. WHITEHEAD,
*Acting Commissioner of Patents.*

It is hereby certified that in Letters Patent No. 1,192,665, granted July 25, 1916, upon the application of William Nichols Mears, of Brookline, Massachusetts, for an improvement in "Rotary Power-Transformers," errors appear in the printed specification requiring correction as follows: Page 12, line 118, claim 8, after the word "rotor" insert the words *contacting therewith at a plurality of spaced points thereby to form a plurality of pockets,;* same page and claim, commencing with the word "contacting", lines 121–122, strike out all to and including the word "pockets" and the following comma, line 124; and that the said Letters Patent should be read with these corrections therein that the same may conform to the record of the case in the Patent Office.

Signed and sealed this 10th day of October, A. D., 1916.

[SEAL.]
R. F. WHITEHEAD,
*Acting Commissioner of Patents.*